INVENTOR.
George B. Long
James M. Valentine

INVENTOR.
George B. Long
James M. Valentine
By Willets Hardman & Fehr
attorneys

United States Patent Office 2,748,239
Patented May 29, 1956

2,748,239

DOMESTIC APPLIANCE

George B. Long, Dayton, and James M. Valentine, Vandalia, Ohio, assignors to General Motors Corporation, Dayton, Ohio, a corporation of Delaware Application September 5, 1952, Serial No. 308,012

10 Claims. (Cl. 219—10.55)

This invention relates to a domestic appliance and more particularly to electronic ovens.

In electronic ovens the wave energy is substantially entirely converted into raising the temperature of the food being cooked. The oven walls remain unheated. This makes it possible for the vapors driven out of the food during cooking or baking to condense upon the cold walls. This contaminates the walls and makes necessary frequent cleaning of the walls.

It is an object of our invention to prevent condensation of cooking vapors upon the walls of the oven and parts thereof.

It is another object of our invention to heat the oven walls and parts thereof especially by the use of waste heat from the electronic apparatus.

It is desirable that an electronic oven be provided with a transparent window. It is another object of our invention to provide a simple arrangement for preventing the vapor driven out of the food during cooking and baking from condensing on such a window.

It is another object of our invention to provide a simple arrangement for preventing the escape of microwave energy through such a window.

It is another object of our invention to provide a simple arrangement for obtaining improved distribution of microwave energy in an electronic oven.

In the form shown in the drawing, these objects are attained by providing an enclosure surrounding and spaced from the oven liner. A blower circulates air over the heat dissipating surfaces of the magnetron tube and thence through a wave guide and through spaces around the oven liner within the enclosure to heat the walls of the oven. The enclosure is provided with a sight glass removable from the top of the range for cleaning. The oven liner is provided with an opening registering with this removable window which is covered by a metal screen clamped by a clamping ring to the portions of the oven liner surrounding the opening to prevent the escape of microwave energy from the oven compartment and also to permit a flow of the heated circulated air over the inner surface of the window into the oven. In the oven, this warm air will further heat the walls of the liner and then escape through a vent provided with a metal screen for preventing the escape of microwave energy. The metal liner is provided with an opening into the wave guide which is covered by a plastic cover to prevent the entrance of air but to admit microwave energy from the wave guide. The wave guide is provided with a stirrer rotated by the air circulation created by the fan. This stirrer improves the distribution of wave energy in the oven for obtaining uniform cooking.

Further objects and advantages of the present invention will be apparent from the following description, reference being had to the accompanying drawings wherein a preferred form of the invention is clearly shown.

Figure 1:
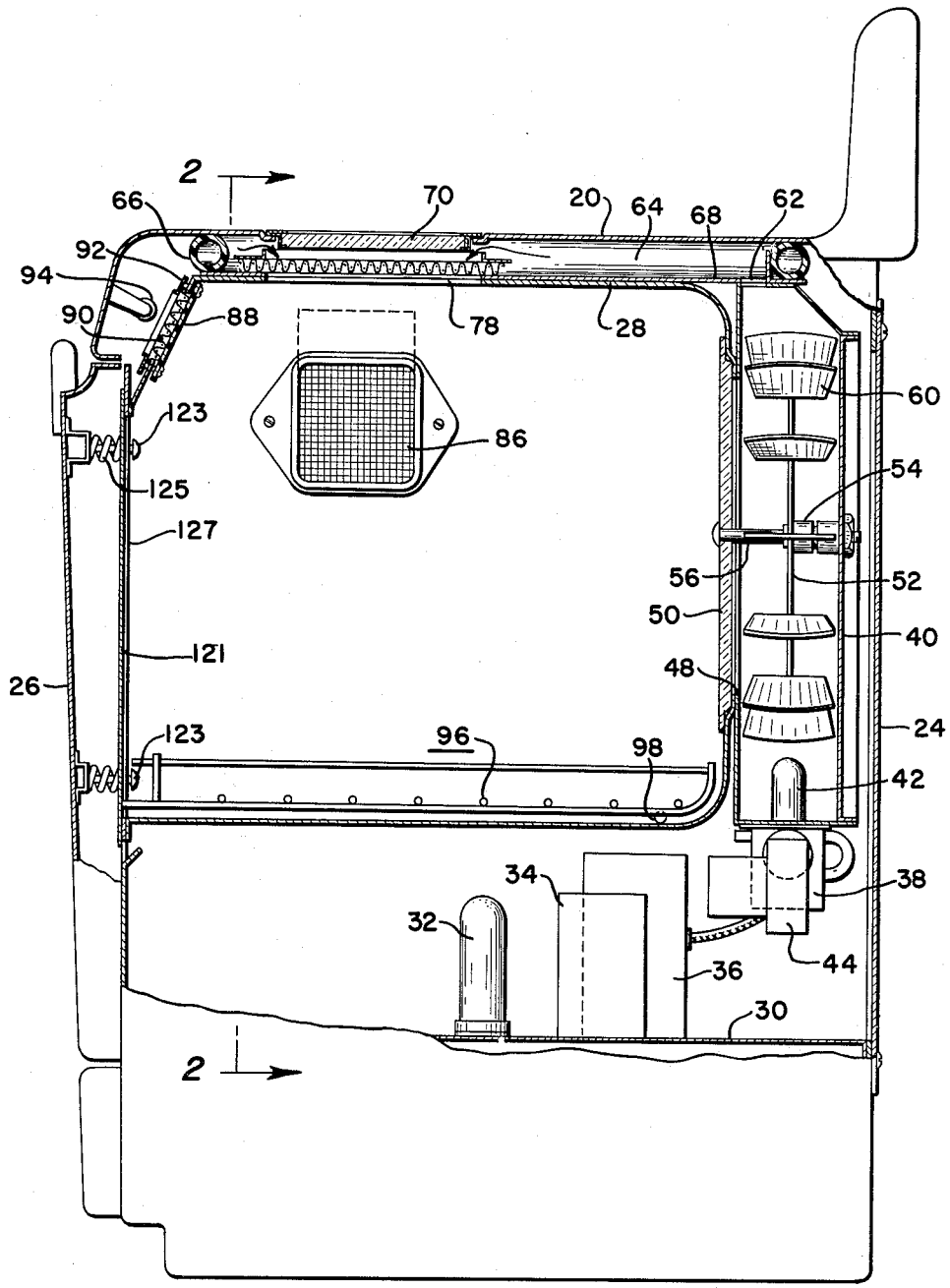
Figure 1 is a vertical sectional view through a domestic electronic oven embodying our invention taken substantially along the line 1—1 of Figure 2.
Figure 2:
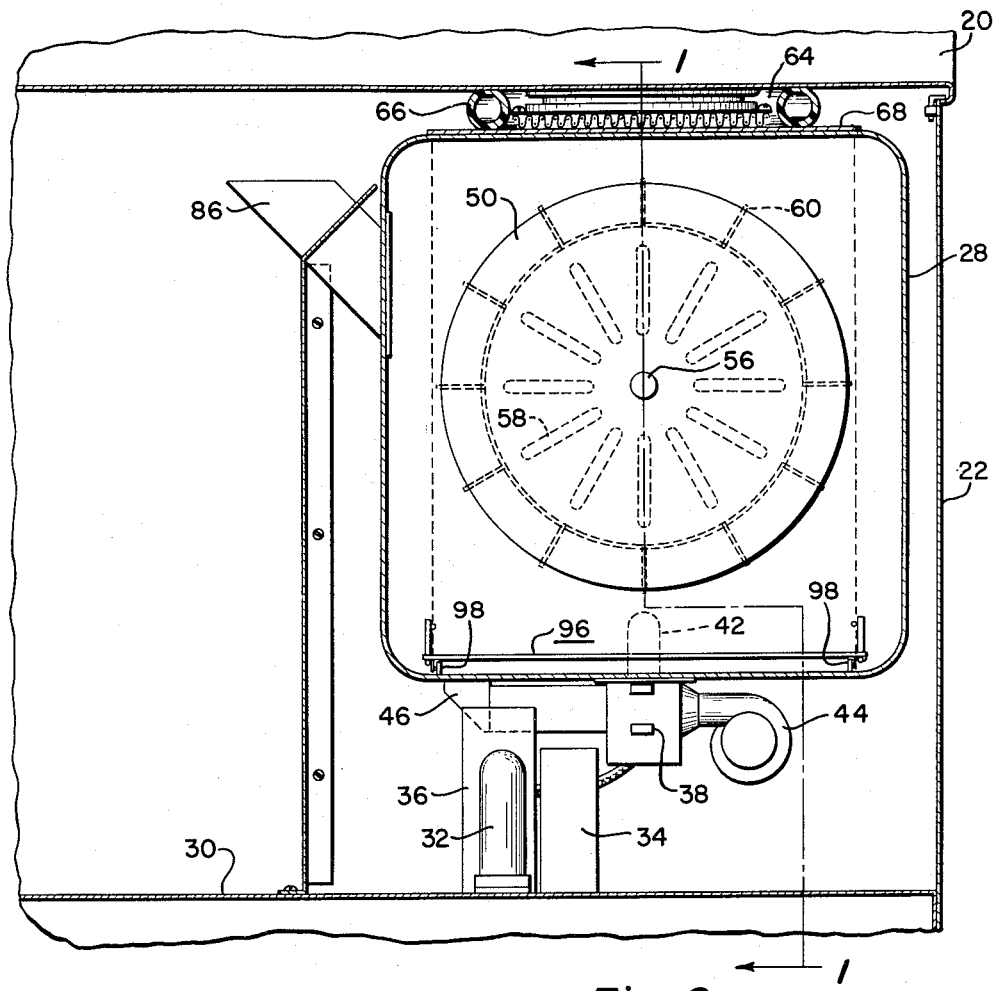
Figure 2 is a sectional view taken substantially along the line 2—2 of Figure 1.
Figure 3:
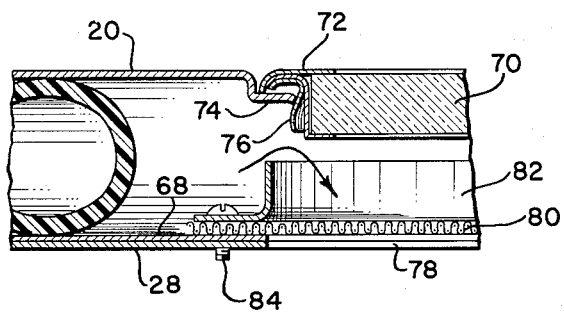
Figure 3 is an enlarged view of a portion of the window and the adjacent parts of the liner and enclosure.

Referring now particularly to the drawing, there is shown a domestic range including an outer shell or enclosure. This enclosure includes a range top 20, side panels 22, a back panel 24 and a door 26. Within this enclosure there is provided a metal oven liner 28 enclosing the oven compartment. Beneath the oven liner 28 there is provided a shelf 30 upon which is supported a larger portion of the electronic microwave generating apparatus or electronic oscillator which includes the rectifier tube 32, a filament transformer 34 and a plate transformer 36. The plate transformer 36 is connected to the magnetron oscillator tube 38 which is supported by the bottom of the wave guide and stirrer chamber 40. This magnetron tube 38 has its dipolte radiator 42 projecting into the wave guide 40 to generate microwaves of about 2450 megacycles.

An electric motor driven blower 44 is provided for cooling the heat dissipating elements of the magnetron tube 38. This blower 44 first forces air into heat exchange relation with the heat dissipating portion of the tube 38 and from this point the heated air is conducted by the metal duct 46 into the left portion of the wave guide 40 through an opening in the bottom thereof.

The rear wall of the oven liner 28 is provided with a large circular opening 48 covered by a cover 50 of plastic material which freely admits microwave energy from the wave guide 40 into the interior of the oven liner 28. To make more uniform the distribution of microwave energy within the interior of the oven liner 28, there is provided a stirrer wheel 52 which is rotatably mounted upon the shaft 54 supported upon a stud fastened to the rear wall of the wave guide 40 as shown in Figure 1. The cover 50 may be supported by a bolt 56 threaded into the shaft 54. The stirrer 52 is in the form of a metal disk having a plurality of radially arranged louvers 58 in its central portion and having a plurality of transverse paddle blades 60 upon its perimeter. The air issuing from the air cooling duct 46 onto the wave guide 40 strikes these paddle blades 60 in a tangential flow arrangement to rotate the wheel 52. This wheel distributes the microwaves generated by the dipole radiator 42 so that they distribute themselves uniformly within the interior of the oven liner 28.

This heated cooling circulating air within the wave guide and stirrer 40 heats the plastic cover and the rear wall of the oven liner 28. The top of the wave guide and stirrer chamber 40 is provided with an opening 62 which admits the heated cooling air to the space 64 between the top of the oven liner 28 and the range top 20. This space 64 is enclosed by plastic tubing 66 which engages the edges of a sheet 68 which is mounted on top of the oven liner 28 and the wave guide 40. The top surface of this tubing 66 engages the bottom surface of the range top 20 to complete the enclosure of the space 64.

The range top 20 is provided with a window. This window is in the form of a heavy circular piece 70 of suitable glass. The perimeter of this glass is held by a flanged ring 72 which rests by gravity upon the flanged opening 74 of the range top 20. The ring 72 is provided with several spring retainers 76 which engage the inner periphery of the flanged opening 74 to resiliently hold the flange 72 and the window 70 in its proper place. The window 70 may be readily removed merely by lifting it out of the flanged opening 74.

The sheet 68 and the oven liner 28 are provided with an opening 78 which is concentric with the window 70. To prevent the escape of the microwave energy from the interior of the oven liner 28 through this opening 78 there is provided a metal screen 80. Preferably this metal screen 80 has its points of crossing joined together by welding or dip soldering. An outwardly flanged clamping ring 82 rests upon the peripheral portions of the screen 80. The ring 82 is clamped by the clamping screws 84 firmly into contact with the metal sheet 68 and the top of the oven liner 28. This makes the screen 80 readily removable for cleaning and yet provides good electrical contact between the screen 80 and the metal sheet 68.

The flanged ring 82 and the screen 80 are spaced a sufficient distance from the window 70 to allow the flow of the heated circulating air in the space 64 between the ring 82 and the edge of the clamp 70 into the space between the window 70 and the screen 80. This air flow heats the window 70 sufficiently to prevent condensation of vapor thereon. This air after flowing between the window 70 and the screen 80 flows through the screen 80 into the interior of the oven liner 28. This air flow keeps vapors away from the window 70 so as to keep it clear for viewing the progress of cooking in the oven compartment. This heated air flow circulates within the oven compartment and warms the walls thereof sufficiently to prevent excessive condensation of vapors driven out of the food during the electronic cooking operations. After circulating through the interior of the oven lining 28 the heated air carries the vapors from the cooking out through a metal screened vent 86 provided in the side wall of the oven. This vent 86 discharges beneath the range top 20 and this air carrying the cooking vapors may escape through one of the burner openings or a vent provided in the range top 20.

The oven liner 28 is provided with a second window 88. Behind this window is a metal screen 90 which is clamped by the clamping ring 92 to the edges of the window opening for preventing the escape of microwave energy through this opening. Behind the screen 90 is an electric light 94 for lighting the interior of the oven liner 28.

The food to be cooked may be supported upon a wire rack 96 having rollers 98 upon its rear portion which roll on the bottom of the oven liner 28. The front portion of the wire rack 96 is connected to the inner plate 121 of the door 26. This inner plate 121 is mounted upon the pins 123. These pins 123 are each surrounded by a compression-type coil spring 125 which together resiliently urge the metal plate 121 firmly into contact with the edges of the oven liner 28 surrounding the door opening 127. The door 26 is provided with a horizontal mounting means which enables it to be pulled out like a drawer to pull out horizontally with it the rack 96 with the rollers 98 riding on the bottom of the oven liner 28.

Through this particular arrangement we have provided a range in which the air used for cooling the heat dissipating portion of the magnetron tube is used for rotating a stirrer to make more uniform the distribution of the microwave energy. This heated air is also used to prevent condensation of cooking vapors upon the oven liner and the door as well as upon the windows provided in the oven liner. This air is also used to carry the cooking vapors out of the oven. The window is readily removed for cleaning.

While the form of embodiment of the invention as herein disclosed constitutes a preferred form, it is to be understood that other forms might be adopted as may come within the scope of the claims which follow.

What is claimed is as follows:

1. An electronic oven including a metal oven liner enclosing an oven compartment, an outer enclosure surrounding but spaced from said liner to form a space surrounding the liner, an electronic apparatus having a heat dissipating means in said space for transmitting heat to said liner to prevent condensation on the liner, said electronic apparatus including means for liberating microwave energy in the interior of said oven compartment, said oven liner having a sight opening, said outer enclosure being provided with a transparent window adjacent to but spaced from said sight opening to permit the flow of air from said heat dissipating means to said window to keep said window free of condensation.

2. An electronic oven including a metal oven liner enclosing an oven compartment, an outer enclosure surrounding but spaced from said liner to form a space surrounding the liner, an electronic apparatus having a heat dissipating means in said space for transmitting heat to said liner to prevent condensation on the liner, said electronic apparatus including means for liberating microwave energy in the interior of said oven compartment, said oven liner having a sight opening, said outer enclosure being provided with a transparent window adjacent to but spaced from said sight opening to permit the flow of air from said heat dissipating means to said window to keep said window free of condensation, said space being provided with tubing contacting the liner and the outer enclosure for guiding the flow of air to said window.

3. An electronic oven including a metal oven liner enclosing an oven compartment, an electronic microwave generating apparatus having means for delivering microwave energy to the interior of said oven compartment, said electronic generating apparatus having a heat dissipating means and an air circulating means for removing heat from the heat dissipating means, and a rotatable stirrer energized by said air circulating means for stirring said microwave energy to improve its distribution in said oven compartment.

4. An electronic oven including a metal oven liner enclosing an oven compartment, an outer enclosure surrounding but spaced from said liner to form a space surrounding the liner, an electronic apparatus having a heat dissipating means in said space for transmitting heat to said liner to prevent condensation on the liner, said electronic apparatus including means for liberating microwave energy in the interior of said oven compartment, said oven liner having a sight opening, said outer enclosure being provided with a transparent window adjacent to but spaced from said sight opening to permit the flow of air from said heat dissipating means to said window to keep said window free of condensation, said sight opening being provided with a metal screen to permit the air conducted to said window to flow through the screen into the oven compartment while the screen prevents the escape of microwave energy, said oven liner being also provided with a vent for allowing the escape of air from the oven compartment, said vent including means for preventing the escape of microwave energy from said oven compartment.

5. An electronic oven including a metal oven liner enclosing an oven compartment, said liner being provided with a sight opening, an electronic apparatus including means for liberating microwave energy within said oven compartment, a metal screen extending over said sight opening for preventing the escape of microwave energy, a clamping ring in contact with said metal screen around said sight opening, means for clamping said ring and said screen to the portion of said liner surrounding the sight opening, and a transparent window extending over said opening.

6. An electronic oven including a metal oven lining enclosing an oven compartment, said lining having an opening therein, an electronic microwave generating apparatus provided with a dipole radiator, a wave guide connecting said dipole radiator with said opening, and a stirrer rotatably mounted within said wave guide substantially concentric with said opening for improving the distribution of microwave energy.

7. An electronic oven including a metal oven lining enclosing an oven compartment, said lining having an opening therein, an electronic microwave generating apparatus provided with a dipole radiator, a wave guide connecting said dipole radiator with said opening, and a stirrer rotatably mounted within said wave guide substantially concentric with said opening for improving the distribution of microwave energy, and a cover of a material having a low dielectric loss for said opening.

8. An electronic oven including a metal oven liner enclosing an oven compartment, an electronic microwave generating apparatus having means for delivering microwave energy to the interior of said oven compartment, said electronic generating apparatus having a heat dissipating means and an air circulating means for removing heat from the heat dissipating means, and a combined rotatable stirrer and turbine having turbine blades extending into the path of flow of the circulating air and stirring means for stirring said microwave energy to improve its distribution in the oven compartment.

9. An electronic oven including a metal oven liner enclosing an oven compartment, an outer enclosure surrounding but spaced from said liner to form a space surrounding the liner, said oven liner having a sight opening, said outer enclosure being provided with a transparent window adjacent to but spaced from said sight opening to permit the flow of air to said window, an electronic apparatus having means for liberating microwave energy in the interior of said oven compartment, said oven liner being provided with a vent having means for preventing the escape of microwave energy from said oven compartment, said sight opening being provided with a metal screen to prevent the escape of microwave energy, and means for circulating air through said space and through said sight opening into the interior of said liner and out of said vent to prevent condensation upon the window and the walls of the liner.

10. An oven including a metal oven liner enclosing an oven compartment, an outer enclosure surrounding but spaced from said liner to form a space surrounding the liner, said oven liner having a sight opening, said outer enclosure being provided with a transparent window adjacent to but spaced from said sight opening, a substantially tubular resilient member located in said space surrounding the liner and extending into contact with the liner and the outer wall in the vicinity of said sight opening to guide the flow of air through said space to said sight opening.

References Cited in the file of this patent

UNITED STATES PATENTS

| | | |
|---|---|---|
| 1,431,719 | Brown | Oct. 10, 1922 |
| 2,490,076 | Maxson | Dec. 6, 1949 |
| 2,526,226 | Gross | Oct. 17, 1950 |
| 2,561,517 | Ladge | July 24, 1951 |
| 2,566,553 | Cline | Sept. 4, 1951 |
| 2,599,033 | Wild | June 3, 1952 |
| 2,618,735 | Hall | Nov. 18, 1952 |
| 2,632,090 | Revercomb et al. | Mar. 17, 1953 |

FOREIGN PATENTS

| | | |
|---|---|---|
| 946,923 | France | June 17, 1949 |
| 979,577 | France | Apr. 27, 1951 |
| 982,334 | France | June 8, 1951 |